Aug. 30, 1949.　　　　K. B. BRITTON　　　2,480,707
IMPULSE ACTUATED ENGINE SYNCHRONIZING MECHANISM
Filed Jan. 12, 1946　　　　　　　　　　　　2 Sheets-Sheet 1
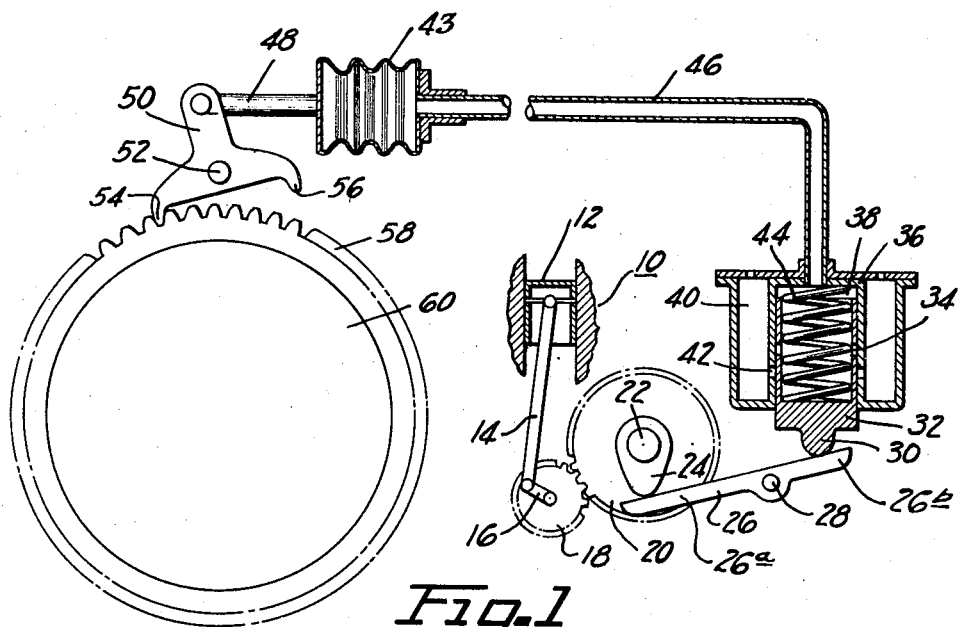
Fig.1
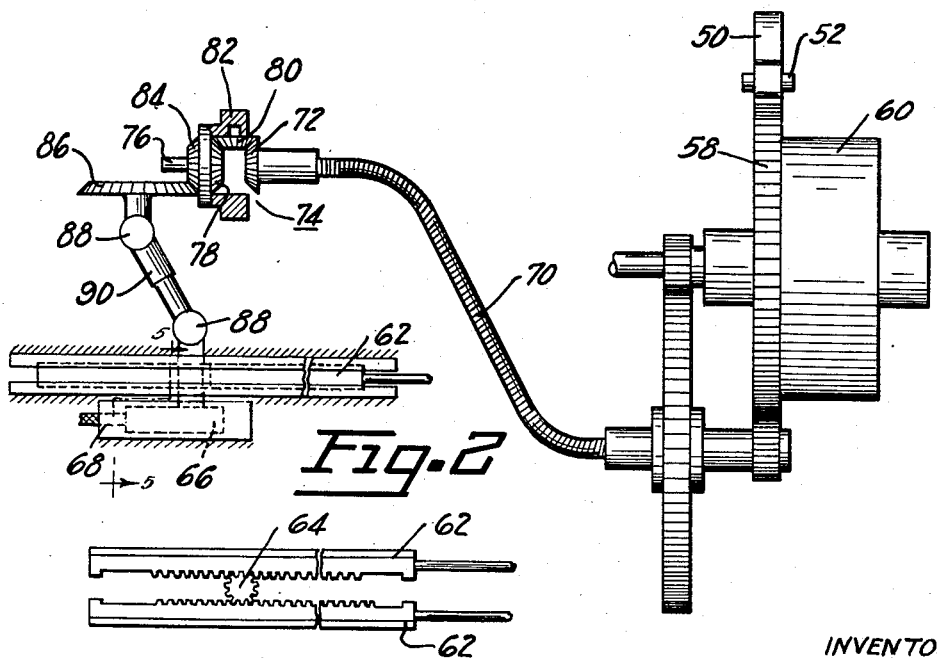
Fig.2
Fig.3
INVENTOR
KARL B. BRITTON
BY Cecil J. Arens
ATTORNEY Aug. 30, 1949.  K. B. BRITTON  2,480,707
IMPULSE ACTUATED ENGINE SYNCHRONIZING MECHANISM
Filed Jan. 12, 1946  2 Sheets-Sheet 2

INVENTOR
KARL B. BRITTON
BY Cecil J. Arens
ATTORNEY

Patented Aug. 30, 1949

2,480,707

UNITED STATES PATENT OFFICE 2,480,707

IMPULSE ACTUATED ENGINE SYNCHRONIZING MECHANISM

Karl B. Britton, Cleveland, Ohio, assignor to Bendix Aviation Corporation, South Bend, Ind., a corporation of Delaware Application January 12, 1946, Serial No. 640,940

3 Claims. (Cl. 60—97)

1

This invention relates to control mechanisms for a plurality of prime movers or engines, and relates particularly to synchronizers for a pair of prime movers or engines. More particularly, the invention relates to means for synchronizing a plurality of aircraft engines, and is particularly adaptable for use in conjunction with the usual type of fluid pressure system employed in modern aircraft.

It is an object of the present invention to provide a novel mechanism for synchronizing a plurality of engines.

Another object is to provide a synchronizer for a plurality of engines where the synchronizer includes novel means for transmitting and receiving impulses in accordance with engine speed.

A further object comprehends a novel synchronizing mechanism which can be used in conjunction with the fluid pressure system of an aircraft.

A yet further object is to provide a synchronizer for a plurality of engines where a differential system is employed for effecting engine synchronization without affecting the throttle settings of said engines.

Still another object is to provide an escapement device for use with an engine synchronizer whereby the speed of the synchronizer will be kept at a desired minimum and at a fixed ratio with respect to engine speed.

Other objects and desirable features of the invention will be best understood after a study of the description hereinafter following when taken with the drawings, which are for the purpose of illustration only, and which together are not to be construed as a definition of the limits of the invention, the scope and limits of the invention being determined only by the terms of the claims which are appended hereto.

In the drawings which are used for purposes of illustration only:

Figure 1 is a diagrammatic showing of one of a pair of internal combustion engines, an impulse producing mechanism attached thereto, and an impulse receiving mechanism;

Figure 2 is a diagrammatic showing of the impulse receiver shown in Figure 1, which is connected to a throttle control through the medium of a differential gear train;

Figure 3 is an elevation view of the throttle control shown in Figure 2;

2

Figure 4:
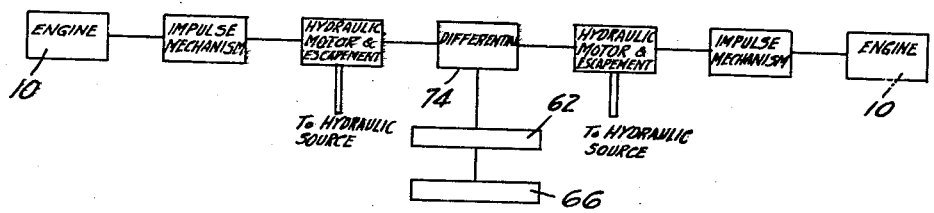
Figures 5, 6:
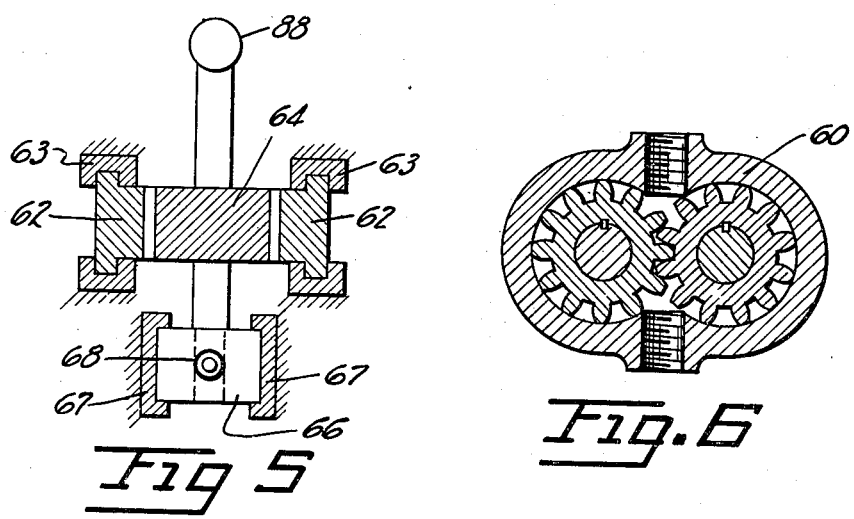

Figure 4 is a block diagram of the mechanism of the invention;

Figure 5 is a view in section taken on the line 5—5 of Figure 2; and

Figure 6 is a view in section of the hydraulic motor.

Referring now particularly to Figure 1, there is shown one of a pair of internal combustion engines indicated generally by the ordinal 10, which produces power through the medium of a piston 12 connected by a rod 14 to a crank 16. The valve actuation system of the internal combustion engine 10 may include a pair of timing gears 18 and 20, gear 20 being rigidly connected to the end of a cam shaft 22, upon which is mounted a cam 24 having the shape shown. As is known to those skilled in the art, the four-cycle-in-line internal combustion engine is so arranged that the crankshaft travels at twice the speed of the cam shaft, and the gears shown at 18 and 20 have teeth ratios accordingly.

Means are provided for furnishing an impulse in accordance with the speed of each of the engines 10. As shown in Figure 1, the means comprises a rocker arm 26 pivotally mounted at 28 and having a long lever arm 26a which contacts a cam 24, and a short lever arm 26b which contacts a nosepiece 30 of a hollow piston 32. The hollow piston is slidably mounted in a cylinder 36 to form a chamber 38. The chamber thus formed is in communication with a source of hydraulic fluid contained within an annular chamber 40 by means of a plurality of ports 42 contained in the wall of cylinder 36 and a plurality of ports 34 contained in the skirt of piston 32, whenever the rocker arm 26 is in contact with the root circle of the cam 24. A spring 44 contained within the hollow piston 32 tends to extend, thus keeping the nosepiece 30 and the cam 24 in firm contact with the rocker arm 26.

The chamber 38 is in communication with a pressure responsive device, which in this case takes the form of a sealed capsule or bellows 43, by means of a conduit 46. The sealed capsule 43 is connected by means of a link 48 to an escapement lever 50 which is pivoted at 52. The escapement lever is equipped with a pair of ears 54 and 56 which alternately engage the teeth of a gear 58 which is driven by a hydraulic motor 60, which may be driven by pressure from any suitable source, as, for example, the fluid pressure system ordinarily employed in aircraft. It may be noted that at all times the motor tends to drive the escapement. The connection between the motor 60 and the gear 58 is of a type, not shown, commonly used with escapements. That is, the driving arrangement between the motor 60 and gear 58 is such as to allow the escapement lever 50 to hold the gear 58 against rotation should the speed thereof tend to exceed engine speed.

The mechanism thus far described furnishes a means for limiting the speed of the motor 60 in accordance with the speed of the engine 10, and the operation of the mechanism thus far described is as follows:

Each revolution of the cam 24 produces a pressure impulse within the chamber 38 and the conduit 46, thus producing alternate and cyclic elongations and contractions of the sealed bellows 43. By means of the escapement 50 and the linkage 48 there will be an alternate engagement by the ears 54 and 56 with the space between adjoining teeth of the gear 58. Thus, since an impulse is transmitted for each two revolutions of the engine 10, the ear 54 will engage every other tooth of the gear 58, and likewise the ear 56 will engage every other tooth of the gear 58. The speed of the gear 58 will therefore be held at a fixed ratio to the speed of the engine 10.

As shown in Figures 2 and 3, means are provided for actuating a pair of throttle controls 62 for each of the engines shown at 10. The throttle controls 62 are slidably carried by guide 63. As shown in Figure 3, the throttle controls 62 may be actuated to bring the engine into synchronization by rotative movement of a pinion 64 which is rotatably held in a master control rod 66. The master control rod 66 is also slidably carried by guides 67. A Bowden cable 68 is attached to the master control rod 66 to provide for manual operation of the throttle controls 62. A given throttle setting for both engines is obtained by sliding the control rod 66 in guides 67. This sliding action of the control rod in guides 67 imparts a sliding movement to the throttle controls carried in guides 63. It will be seen, then, that synchronization of the engines 10 by controlling the position of the throttle 62 can be achieved by movement of the control arms of the throttle rods relative to each other. Thus, it may be necessary to increase the speed of one of the engines 10 to bring it up to the speed of the other; or, it may be necessary to reduce the speed of one engine to bring it down to that of the other. For a particular throttle setting, however, it is generally a better expedient to change the throttle positions of both engines, so that they approach the position as determined by the initial throttle setting, which is as has been described, achieved by a translative movement of the pinion 64 which is held in the rod 66.

For changing the throttle position of each of the engines 10 to achieve synchronization, a differential system is employed in conjunction with the throttle control rods 62, the pinion 64, and the speed controlled motor 60, one each of which is associated with each engine 10. As shown in Figure 2, the speed controlled motor 60 is connected through the system of gearing associated therewith and by a flexible cable 70 to a pinion 72 of a differential gear system 74. Similarly, the fluid motor 60 of the other engine 10 is connected, by a shaft 76, to a beveled pinion gear 78 of the differential gear system 74. A beveled pinion gear 80 lies intermediate the differential pinion gears 72 and 78 and is rotatably held in a spider 82 of the differential gear train 74. The spider 82 has fixedly mounted thereon a beveled pinion 84 which engages a beveled gear 86 connected to the pinion 64 by means of a plurality of universal joints 88 which are connected at the spline 90. The spider 82, gear 84, integral with the spider, and the pinion gear 80 all rotate as a unit about the shaft 76 to drive gear 86, when the engines are out of synchronism.

The operation of the system thus far described is as follows:

Each engine 10 produces impulses in accordance with its speed, and the speed of each engine is reflected in the speed of its associated motor 60. When the motors 60 are in synchronization, the beveled pinion gear 80, which lies between the beveled pinion gears 72 and 78 which are driven in opposite directions, will rotate about its axis. When the two motors 10 are no longer in synchronization the spider 82 will be caused to rotate, thereby transmitting rotative movement of the beveled pinion 84 and to the beveled gear 86. The rotative movement of the beveled gear 86 will, through the universal joints 88 and the splined connection 90, effect a rotative movement to the pinion 64, which will cause the two throttle control rods to move with respect to each other. It will be seen, therefore, that one control rod 62 will cause the throttle of its associated engine 10 to be opened slightly, and that the other control rod 62 will cause the throttle of its associated engine to be closed slightly, thereby bringing the two engines 10 back to synchronization.

Thus has been described a novel and useful improvement in the art of synchronizing a pair of engines. While the invention has been described with reference to a particular embodiment or preferred form, it is to be distinctly understood that the invention is not limited by terms of the embodiment shown, nor otherwise than by the terms of the appended claims.

I claim:

1. A synchronizing device for a plurality of engines comprising means associated with each of said engines for transmitting mechanical impulses in accordance with the speed of its associated engine, means including a hydraulic motor associated with each engine, means including an escapement operatively connected to said motor for controlling the rotation thereof, said escapement being driven by said impulses, whereby said second named means is adapted to rotate at a fixed ratio with respect to its associated engine, a throttle for each engine, and means for changing the position of said throttles in accordance with the difference in speed between each of said engines.

2. The combination, with two engines, of a differential gear system, a hydraulic motor for each engine having a driving connection to the differential gear system, means including a gear to be rotated interposed between the differential gear and motor in each of said driving connections, means interconnecting each of said gears to its associated engine for controlling the rotation of each gear and comprising an escapement operatively engaging each of said gears, a hydraulic impulse device connected to each engine, a fluid bellows interposed between each escapement and its corresponding hydraulic impulse device, whereby the speed of the gear will be held at a fixed ratio of the speed of the engine, and means connected to the differential gear system for bringing the engines into synchronization.

3. The combination, with two engines, of a differential gear system, a hydraulic motor for each engine having a driving connection to the differential gear system, means including a gear to be rotated interposed between the differential gear and motor in each of said driving connections, an escapement mechanism associated with each gear, means including a fluid connection between each engine and each of the escapements, whereby engine rotation produces impulses in said fluid connection to operate the escapements so that the speed of each gear will reflect a definite relationship of the speed of its corresponding engine, and means connected to the differential gear system and responsive to the difference in speeds of said gears for controlling said engines to tend to bring their speeds closer together.

KARL B. BRITTON.

REFERENCES CITED

The following references are of record in the file of this patent:

UNITED STATES PATENTS

| Number | Name | Date |
|---|---|---|
| 2,087,291 | Moross | July 20, 1937 |
| 2,104,582 | Carlson | July 4, 1938 |
| 2,220,080 | Crane et al. | Nov. 5, 1940 |